US011015004B2

(12) United States Patent
Dossi et al.

(10) Patent No.: US 11,015,004 B2
(45) Date of Patent: May 25, 2021

(54) FLUOROELASTOMER COMPOSITION

(71) Applicant: SOLVAY SPECIALTY POLYMERS ITALY S.P.A., Bollate (IT)

(72) Inventors: Marco Dossi, Milan (IT); Marco Avataneo, Senago (IT); Terry Michael Kitchens, Cleveland, GA (US)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 15/760,810

(22) PCT Filed: Sep. 16, 2016

(86) PCT No.: PCT/EP2016/072051

§ 371 (c)(1),
(2) Date: Mar. 16, 2018

(87) PCT Pub. No.: WO2017/046379

PCT Pub. Date: Mar. 23, 2017

(65) Prior Publication Data

US 2018/0258206 A1 Sep. 13, 2018

Related U.S. Application Data

(60) Provisional application No. 62/220,556, filed on Sep. 18, 2015.

(51) Int. Cl.
*C08F 214/22* (2006.01)

(52) U.S. Cl.
CPC ........ *C08F 214/22* (2013.01); *C08F 214/222* (2013.01); *C08F 214/225* (2013.01)

(58) Field of Classification Search
CPC C08F 214/222; C08F 214/225; C08F 214/22; C08L 27/16
See application file for complete search history.

(56) References Cited

U.S. PATENT DOCUMENTS 3,752,787 A 8/1973 De Brunner
3,876,654 A 4/1975 Pattison
4,233,427 A 11/1980 Bargain et al.
4,259,463 A 3/1981 Moggi et al.
4,985,520 A * 1/1991 Hayashi ................ C08F 214/22 526/254
5,852,149 A * 12/1998 Abusleme ............ C08F 214/22 526/247
5,883,197 A * 3/1999 Barbieri ................ C08J 9/0052 525/340
5,955,556 A * 9/1999 McCarthy .............. C08F 14/18 526/249
7,521,513 B2 * 4/2009 Tang .................... C08F 214/18 526/242
2010/0068436 A1 * 3/2010 Shimizu ............... C08F 214/18 428/36.91
2011/0269911 A1 * 11/2011 Morita ................. C08F 214/22 525/326.2
2014/0058052 A1 * 2/2014 Chernysheva ........ C08F 214/22 526/93
2017/0081447 A1 * 3/2017 Dossi ........................ C08F 2/22

FOREIGN PATENT DOCUMENTS

EP 120462 A1 10/1984
EP 182299 A2 5/1986
EP 335705 A1 10/1989
EP 684277 A1 11/1995
EP 1347012 B1 12/2006
EP 2868674 A1 5/2015
WO 2012150253 A1 11/2012
WO 2012150256 A1 11/2012

OTHER PUBLICATIONS

Pianca M. et al., "End groups in fluoropolymers", Journal of Fluorine Chemistry, 1999, vol. 95, pp. 71-84—Elsevier Science SA.

* cited by examiner

*Primary Examiner* — Nicole M. Buie-Hatcher
(74) *Attorney, Agent, or Firm* — Osha Bergman Watanabe & Burton LLP

(57) ABSTRACT

The invention pertains to a fluoroelastomer composition comprising: (a) a vinylidene fluoride-based fluoroelastomer [fluoroelastomer (A)] comprising recurring units derived from vinylidene fluoride (VDF) and recurring units derived from at least one additional (per)fluorinated monomer; said fluoroelastomer (A): —possessing a polydispersity index (IMWD) of between 1.5 and 3.5, —comprising an amount of polar end groups of formula —$CF_2CH_2OH$ of at least 3 mmol/kg and at most 6 mmol/kg, and —further comprising end of chain groups of formula —$CF_2H$, —$CF_2CH_3$, and, optionally, —OC(o)—$R_H$ (with $R_H$ being a $C_1$-$C_6$ alkyl group) in an amount such to satisfy the following inequality: [—$CF_2CH_2OH$]+[—$CF_2H$]+[—$CF_2CH_3H$—OC(o)$R_H$] $\leq 30+(2\times10^6)/M_n$, (b) at least one polyhydroxylated curing agent; (c) at least one accelerant; (d) at least one metal oxide selected from the group consisting of divalent metal oxides; and (e) optionally, at least one metal hydroxide, wherein the amount of said metal hydroxide, if present, is below 3 phr, based on 100 weight parts of fluoroelastomer (A).

18 Claims, 1 Drawing Sheet

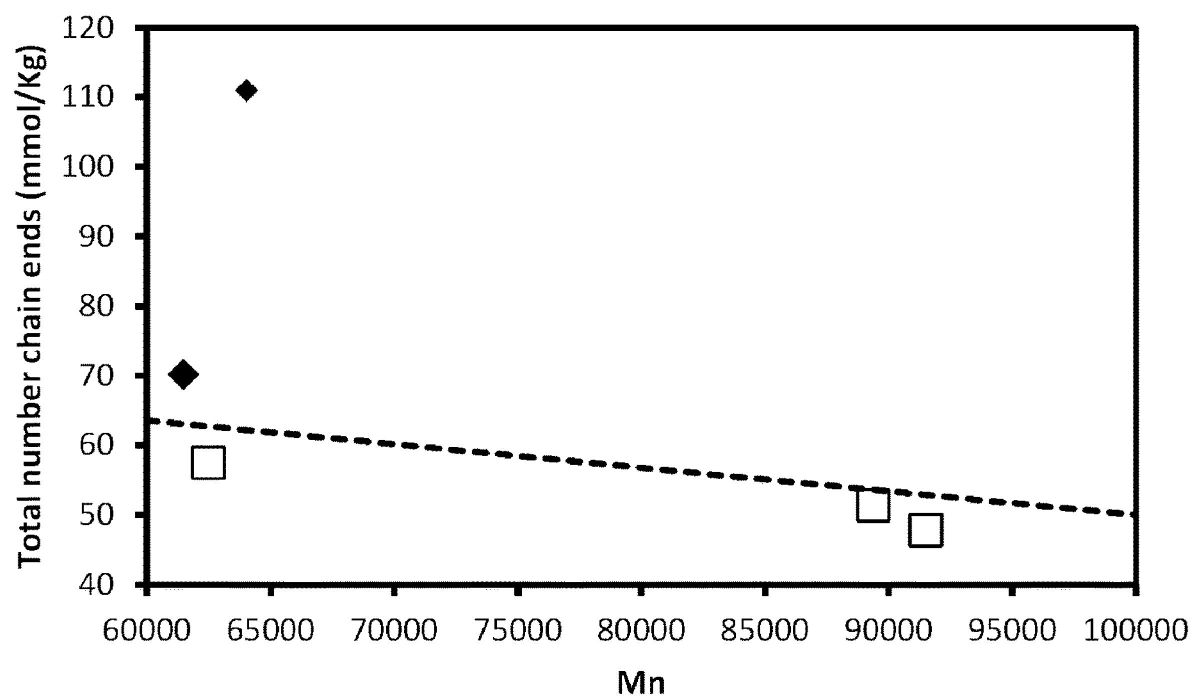
Total number chain ends (mmol/Kg)
120
110
100
90
80
70
60
50
40
60000
65000
70000
75000
80000
85000
90000
95000
100000
Mn

FLUOROELASTOMER COMPOSITION

CROSS-REFERENCE TO RELATED APPLICATION

This application is a U.S. national stage entry under 35 U.S.C. 071 of International Application No. PCT/EP2016/072051 filed Sep. 16, 2016, which claims priority to U.S. provisional application No. 62/220,556 filed on Sep. 18, 2015. The entire contents of these applications are explicitly incorporated herein by this reference.

TECHNICAL FIELD

The present invention relates to curable fluoroelastomers, able to give cured fluoroelastomers with improved sealing properties, i.e. improved compression set on O-ring, improved mechanical properties shown as improved combination of stress and elongation at break.

BACKGROUND ART

Fluoroelastomers are a class of high-performance materials with a diverse range of applications ranging from O-rings, valve stem seals, shaft seals, gaskets and fuel hoses in automotive applications to seals and packing for oil wells, further including seals, O-rings and other parts in semiconductors' manufacturing devices.

Since several years, vinylidene fluoride based fluoroelastomers have indeed established themselves as premium materials in the automotive, chemical petrochemical and electronics industries thanks to their outstanding mechanical properties in a broad temperature operating window and to their un-matched chemical and permeation resistance.

Ionic curing is a widely spread technique for crosslinking vinylidene fluoride based fluoroelastomers, based on the presence of acidic hydrogen atoms in the fluoroelastomer backbone, which can react with dihydroxyl compounds for forming a three-dimensional network.

Generally, ionic curing requires addition of suitable amounts of bases, typically inorganic metal hydroxides, for activating the said acidic hydrogen atoms towards nucleophilic reactions with dihydroxyl compounds and hence achieving rapid crosslinking reaction efficiencies, as notably required in automated molding processing techniques. Indeed, in these techniques, which are widely used for the high throughput manufacture of fluoroelastomer cured parts, curing rate shall be such to enable obtaining formation of the cured network in limited molding times, providing for parts possessing structural integrity by quick cycle times.

While an increase of the amount of metal hydroxides is generally considered as beneficial for increasing crosslinking kinetics, addition of the said metal hydroxides may have a detrimental impact on chemical and thermal resistance.

In the past, approaches for reducing the amount of metal hydroxides in ionically curable vinylidene fluoride (VDF) based fluoroelastomer compounds have been proposed. Notably, EP 1347012 B (SOLVAY SOLEXIS SPA) 20 Dec. 2006 teaches that fluoroelastomers based on VDF which are substantially free from polar end groups can be crosslinked in the presence of an amount of metal hydroxides (in particular $Ca(OH)_2$) of less than 2.5 phr. Nevertheless, as shown in comparative example 5 of present application, for providing such polar end groups-free fluoroelastomer, a polymerization technique is suggested based on the use of organic peroxide initiators: for achieving acceptable reaction kinetics in these conditions, high polymerization temperatures are required, which, unavoidably, provide for VDF-fluoroelastomers having quite irregular structure, due to side reactions including intra-molecular transfer, and broad molecular weight distribution. These microstructual properties are such to negatively affect the overall mechanical and sealing properties of resulting cured compound.

The need was felt to have available curable VDF-based fluoroelastomer compounds which can be easily injection moulded with automatic cycles to prepare cured articles having optimal combination of mechanical and sealing properties.

BRIEF DESCRIPTION OF DRAWINGS

The FIGURE is a sketch of total number of chain ends (y) (in mmol/kg) as a function of $M_n$ for fluoroelastomers which are suitable for the composition of the invention (□) and those of comparison (♦), including a dotted line corresponding to the relation y (mmol/kg)=$30+(2\times10^6)/M_n$.

SUMMARY OF INVENTION

The invention thus pertains to a fluoroelastomer composition comprising:

(a) a vinylidene fluoride-based fluoroelastomer [fluoroelastomer (A)] comprising recurring units derived from vinylidene fluoride (VDF) and recurring units derived from at least one additional (per)fluorinated monomer; said fluoroelastomer (A):
- possessing a polydispersity index ($I_{MWD}$) of between 1.5 and 3.5,
- comprising an amount of polar end groups of formula $—CF_2CH_2OH$ of at least 3 mmol/kg and at most 6 mmol/kg, and
- further comprising end of chain groups of formula $—CF_2H$, $—CF_2CH_3$, and, optionally, $—OC(O)—R_H$ (with $R_H$ being a $C_1$-$C_6$ alkyl group) in an amount such to satisfy the following inequality:

$$[—CF_2CH_2OH]+[—CF_2H]+[—CF_2CH_3]+[—OC(O)R_H]\leq 30+(2\times10^6)/M_n,$$

(b) at least one polyhydroxylated curing agent;

(c) at least one accelerant;

(d) at least one metal oxide selected from the group consisting of divalent metal oxides; and (e) optionally, at least one metal hydroxide, wherein the amount of said metal hydroxide, if present, is below 3 phr, based on 100 weight parts of fluoroelastomer (A).

The Applicant has surprisingly found that when formulating a VDF-based fluoroelastomer comprising a limited, but non-zero, concentration of polar hydroxyl end groups, having a narrow molecular weight distribution and a regular structure with limited number of branches/chain ends, as above detailed, with cross-linking agents and accelerators typical of ionic curing, outstanding crosslinking network formation can be achieved using low amount or even in the absence of bases (metal hydroxides, in particular $Ca(OH)_2$), with the sole addition of certain metal oxides, hence gaining significantly in mechanical and sealing properties.

For the purposes of this invention, the term "fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer). True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C., even more preferably below −5° C.

Fluoroelastomer (A) typically comprises at least 15% moles, preferably at least 20% moles, more preferably at least 35% moles of recurring units derived from VDF, with respect to all recurring units of the fluoroelastomer.

Fluoroelastomer (A) typically comprises at most 85% moles, preferably at most 80% moles, more preferably at most 78% moles of recurring units derived from VDF, with respect to all recurring units of the fluoroelastomer.

Non limitative examples of suitable (per)fluorinated monomers, recurring units derived therefrom being comprised in the fluoroelastomer (A), are notably:

(a) $C_2$-$C_8$ perfluoroolefins, such as tetrafluoroethylene (TFE) and hexafluoropropylene (HFP);

(b) hydrogen-containing $C_2$-$C_8$ olefins different from VDF, such as vinyl fluoride (VF), trifluoroethylene (TrFE), perfluoroalkyl ethylenes of formula $CH_2{=}CH{-}R_f$, wherein $R_f$ is a $C_1$-$C_6$ perfluoroalkyl group;

(c) $C_2$-$C_8$ chloro and/or bromo and/or iodo-fluoroolefins such as chlorotrifluoroethylene (CTFE);

(d) (per)fluoroalkylvinylethers (PAVE) of formula $CF_2{=}CFOR_f$, wherein $R_f$ is a $C_1$-$C_6$ (per)fluoroalkyl group, e.g. $CF_3$, $C_2F_5$, $C_3F_7$;

(e) (per)fluoro-oxy-alkylvinylethers of formula $CF_2{=}CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

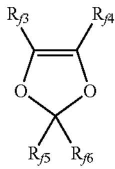

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably $-CF_3$, $-C_2F_5$, $-C_3F_7$, $-OCF_3$, $-OCF_2CF_2OCF_3$; preferably, perfluorodioxoles;

(g) (per)fluoro-methoxy-vinylethers (MOVE, hereinafter) having formula:

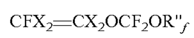

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2{=}F$, H; preferably $X_2$ is F and $R''_f$ is $-CF_2CF_3$ (MOVE1); $-CF_2CF_2OCF_3$ (MOVE2); or $-CF_3$ (MOVE3).

It is generally preferred for the fluoroealstomer (A) to comprise, in addition to recurring units derived from VDF, recurring units derived from HFP.

In this case, fluoroelastomer (A) typically comprises at least 10% moles, preferably at least 12% moles, more preferably at least 15% moles of recurring units derived from HFP, with respect to all recurring units of the fluoroelastomer.

Still, fluoroelastomer (A) typically comprises at most 45% moles, preferably at most 40% moles, more preferably at most 35% moles of recurring units derived from HFP, with respect to all recurring units of the fluoroelastomer.

Fluoroelastomers (A) suitable in the compositions of the invention may comprise, in addition to recurring units derived from VDF and HFP, one or more of the followings:

recurring units derived from at least one bis-olefin [bis-olefin (OF)] having general formula:

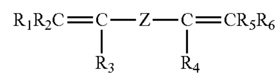

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;

recurring units derived from at least one (per)fluorinated monomer different from VDF and HFP; and recurring units derived from at least one hydrogenated monomer.

Examples of hydrogenated monomers are notably non-fluorinated alpha-olefins, including ethylene, propylene, 1-butene, diene monomers, styrene monomers, alpha-olefins being typically used. $C_2$-$C_8$ non-fluorinated alpha-olefins (Ol), and more particularly ethylene and propylene, will be selected for achieving increased resistance to bases.

The bis-olefin (OF) is preferably selected from the group consisting of those complying with formulae (OF-1), (OF-2) and (OF-3):

(OF-1)

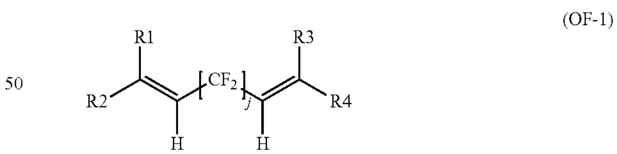

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

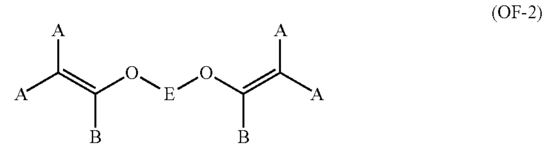

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a $—(CF_2)_m—$ group, with m being an integer from 3 to 5; a preferred bis-olefin of (OF-2) type is $F_2C═CF—O—(CF_2)_5—O—CF═CF_2$.

(OF-3)

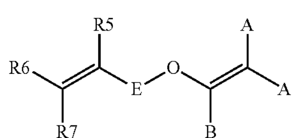

wherein E, A and B have the same meaning as above defined; R5, R6, R7, equal or different from each other, are H, F or $C_{1-5}$ alkyl or (per)fluoroalkyl group.

Most preferred fluoroelastomers (A) are those having following compositions (in mol %):

(i) vinylidene fluoride (VDF) 45-85%; hexafluoropropene (HFP) 15-45%; tetrafluoroethylene (TFE) 0-30%;

(ii) vinylidene fluoride (VDF) 20-30%; hexafluoropropene (HFP) 18-27%; $C_2$-$C_8$ non-fluorinated olefins (01) 5-30%; perfluoroalkyl vinyl ethers (PAVE) 0-35%; bis-olefin (OF) 0-5%;

(iii) vinylidene fluoride (VDF) 60-75%; hexafluoropropene (HFP) 10-25%; tetrafluoroethylene (TFE) 0-20%; perfluoroalkyl vinyl ethers (PAVE) 1-15%.

As said, the fluoroelastomer (A) comprises an amount of polar end groups of formula $—CF_2CH_2OH$ of at least 3 mmol/kg and at most 6 mmol/kg, preferably of at least 3.5 mmol/kg, and/or preferably at most 5 mmol/kg.

The amount of polar end groups of formula $—CF_2CH_2OH$ is determined by NMR, following the methodology which is notably described in PIANCA, Maurizio, et al. End groups in fluoropolymers. *Journal of Fluorine Chemistry.* 1999, vol. 95, p. 71-84.

These end groups are generally present as chain end because of initiation by inorganic initiators in the polymerization leading to fluoroelastomer (A).

Without being bound by this theory, the Applicant is of the opinion that the presence of an excessive amount of these groups is such to interfere with the crosslinking process, especially when using very limited amounts of basic compounds, or working in the absence of the same.

On the other side, a certain amount of these groups is necessary for ensuring latex stability during fluoroelastomer (A) manufacture, in particular when polymerization is carried out in the absence of fluorosurfactants, and for ensuring proper dispersibility of metal oxide in the fluoroelastomer (A) matrix.

The fluoroelastomer (A) possesses a relatively narrow molecular weight distribution, that is to say a polydispersity index $I_{MWD}$, defined as ratio between weight averaged molecular weight (Mw) and number averaged molecular weight ($M_n$) of 1.5 to 3.5.

Polydispersity index is determined advantageously by gel permeation chromatography.

This relatively narrow molecular weight distribution ensures that polymer chains are mostly of substantially similar length, with limited amounts of chains having substantially shorter or substantially longer chain lengths.

Without being bound by this theory, the Applicant is of the opinion that this regularity in the length of chains of fluoroelastomer (A) is contributing effectively to a regular and homogeneous cross-linking, with equally distributed cross-linking densities, with substantially no oligomers which might be difficult to trap in three-dimensional network, and substantially no chains having very long chain length, hence poor mobility, and potentially hindering the crosslinking process.

The fluoroelastomer (A) has a regular structure, with limited chain ends, including limited amount of branches terminated by end groups of formula $—CF_2H$ and/or $—CF_2CH_3$, which are typically encountered during radical polymerization of vinylidene fluoride. Indeed, when polymerizing vinylidene fluoride under radical conditions, generation of short branches by intra-chain transfer (back-biting) processes as depicted in scheme below may occur:

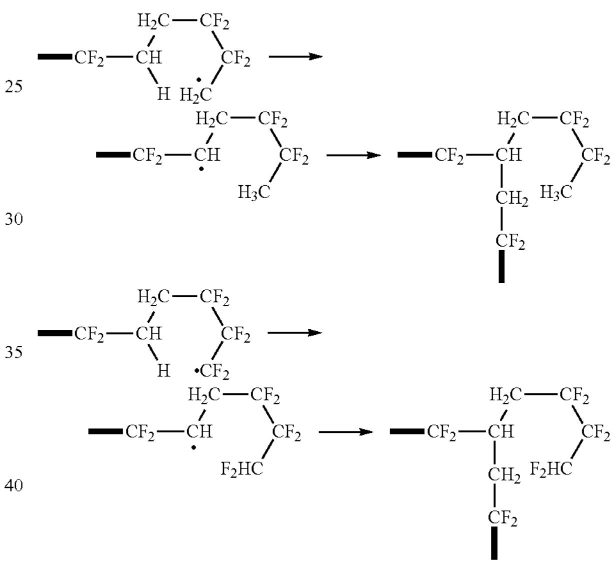

By appropriate selection of polymerization conditions, including e.g. by reducing polymerization temperature, increasing monomer pressure, etc. . . . , it is possible to obtain fluoroelastomers (A) wherein the amount of said short branches terminated by $—CF_2H$ and/or $—CF_2CH_3$ is reduced.

On the other side, an unavoidable amount of chain ends is the result of initiation/termination, which is necessarily related to the presence of at least two terminal groups in each fluoroelastomer (A) chain. As a consequence, requirement for an ordered microstructure cannot be defined as an absolute threshold in the amount of end of chain groups, but is to be expressed having regards to the actual length of the molecular chain.

As said, the fluoroelastomer (A) comprises end of chain groups of formula $—CF_2H$, $—CF_2CH_3$, and, optionally, $—OC(O)—R_H$ (with $R_H$ being a $C_1$-$C_6$ alkyl group); end of chain groups of formula $—OC(O)—R_H$ can be present when the fluoroelastomer (A) has been manufactured by polymerization in the presence of certain ester-type chain transfer agents for regulating molecular weight.

It is generally understood that the fluoroelastomer (A) does not comprise any significant amount of end of chain groups different from those above detailed. If any of those irregularities/different end of chain groups were to be present, they are comprised in the fluoroelastomer (A) in amounts of preferably less than 1% moles, with respect to the total amount of end of chain groups of any of formulae —$CF_2CH_2OH$, —$CF_2H$, —$CF_2CH_3$, —$OC(O)R_H$, as above detailed.

As explained above, fluoroelastomer (A) to be used in the composition according to the invention have a total number of chain ends such to satisfy the following inequality:

$$[—CF_2CH_2OH]+[—CF_2H]+[—CF_2CH_3]+[—OC(O)R_H]\leq 30+(2\times 10^6)/M_n.$$

Indeed, when formulating the said fluoroelastomer (A), opportunely selected so as to have a total number of chain ends such to satisfy the above mentioned inequality, and complying with all other mentioned properties (polydispersity index, concentration of —$CF_2CH_2OH$ groups) a curable compound is obtained which possess outstanding crosslinking ability and which delivers an optimized compromise of mechanical and sealing properties, thermal and chemical resistance, absence of fouling.

As said, the composition of the invention comprises (b) at least one polyhydroxylated curing agent.

Aromatic or aliphatic polyhydroxylated compounds, or derivatives thereof, may be used as polyhydroxylated curing agents; examples thereof are described, notably, in EP 335705 A (MINNESOTA MINING) Apr. 10, 1989 and U.S. Pat. No. 4,233,427 (RHONE POULENC IND) Nov. 11, 1980. Among these, mention will be made in particular of dihydroxy, trihydroxy and tetrahydroxy benzenes, naphthalenes or anthracenes; bisphenols of formula (B):

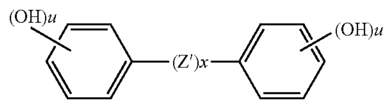

wherein:

- Z' is selected from the group consisting of bivalent $C_1$-$C_{13}$ alkyl or alkylidene group, $C_4$-$C_{13}$ cycloaliphatic, $C_6$-$C_{13}$ aromatic or arylalkylenic groups, optionally substituted with at least one chlorine or fluorine atom; a thio (—S—), oxy (—O—), carbonyl (—C(O)—), sulphinyl (—S(O)—) and sulphonyl group (—$SO_2$—);
- x is 0 or 1;
- u, equal to or different from each other, is independently at each occurrence an integer of at least 1, preferably 1 or 2;
- and wherein the phenyl rings can be optionally substituted by one or more substituents selected from the group consisting of chlorine, fluorine, bromine; —CHO, $C_1$-$C_8$ alkoxy groups, —$COOR_{10}$ groups, wherein $R_{10}$ is H or $C_1$-$C_8$ alkyl, $C_6$-$C_{14}$ aryl, $C_4$-$C_{12}$ cycloalkyl.

When Z' is a $C_1$-$C_{13}$ divalent alkyl group, it can be for example methylene, ethylene, chloroethylene, fluoroethylene, difluoroethylene, 1,3-propylene, tetramethylene, chlorotetramethylene, fluorotetramethylene, trifluorotetramethylene, 2-methyl-1,3-propylene, 2-methyl-1,2-propylene, pentamethylene, hexamethylene.

When Z' is a $C_1$-$C_{13}$ divalent alkylidene group, it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, 1,1-cyclohexylidene.

When Z' is $C_4$-$C_{13}$ cycloaliphatic group, it can be for example 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene.

When Z' is a $C_6$-$C_{13}$ aromatic or arylalkylenic group, it can be for example m-phenylene, p-phenylene, 2-chloro-1,4-phenylene, 2-fluoro-1,4-phenylene, o-phenylene, methyl phenylene, dimethylphenylene, trimethylphenylene, tetramethyl phenylene, 1,4-naphthylene, 3-fluoro-1,4-naphthylene, 5-chloro-1,4-naphthylene, 1,5-naphtylene and 2,6-naphthylene.

Among the polyhydroxylated curing agents of formula (B), hexafluoroisopropylidene bis (4-hydroxybenzene), known as bisphenol AF, 4,4'-dihydroxydiphenyl sulphone and isopropylidene bis (4-hydroxybenzene), known as bisphenol A, are preferred, with Bisphenol AF being particularly preferred.

Other polyhydroxylic curing agents are dihydroxy benzenes selected from the group consisting of catechol, resorcinol, 2-methyl resorcinol, 5-methyl resorcinol, hydroquinone, 2-methyl hydroquinone, 2,5-dimethyl hydroquinone, 2-t-butyl hydroquinone, and dihydroxy naphthalenes, in particular 1,5-dehydroxynaphthalene.

It is also understood that derivatives of aforementioned aromatic or aliphatic polyhydroxylated compounds can be used; mention can be notably made of metal salts formed by the anion of said aromatic or aliphatic polyhydroxylated compounds wherein one or more of the hydroxyl group has been deprotonated, with one or more than one cation (as required for reaching neutrality) of a metal, typically of an alkaline or alkaline earth metal; examples thereof are notably the dipotassic salt of bisphenol AF and the monosodic monopotassic salt of bisphenol AF.

Further in addition, -onium hydroxylates, i.e. salts formed by the anion of said aromatic or aliphatic polyhydroxylated compounds wherein one or more of the hydroxyl group has been deprotonated, with one or more -onium cation can also be used. As cations, all the cations corresponding to the above -onium organic derivatives accelerant component c) can be used.

The amount of the polydroxylated curing agent is generally of at least 0.5 phr, preferably at least 1 phr, and/or generally at most 15 phr, preferably at most 10 phr, with respect to the fluoroelastomer (A) weight.

The composition of the invention comprises (c) at least one accelerant; accelerants for ionic curing of VDF-based fluoroelastomers are well known in the art.

The accelerants suitable in the composition of the present invention are generally selected from the group consisting of organic onium compounds, amino-phosphonium derivatives, phosphoranes, imine compounds.

Organic onium compounds which are suitable in the composition of the invention generally comply with formula (O):

wherein:

- Q is selected from the group consisting of nitrogen, phosphor, arsenic, antimony, sulphur; preferably phosphor or nitrogen;
- $X_I$ is an organic or inorganic anion, preferably selected from the group consisting of halides, sulphate, acetate, phosphate, phosphonate, hydroxide, alkoxide, phenate, bisphenate;
- n is the valence of the $X_I$ anion;
- each of $R^2$, $R^3$, $R^4$, $R^5$, equal to or different from each other, is independently the one from the other selected from the group consisting of:

a $C_1$-$C_{20}$ alkyl group, a $C_6$-$C_{20}$ aryl group, a $C_6$-$C_{20}$ arylalkyl group, a $C_1$-$C_{20}$ alkenyl group;

a halogen selected from chlorine, fluorine, bromine;

a cyano group, a group of formula —$OR_B$ or —CO-$OR_B$, wherein $R_B$ is an alkyl, aryl, arylalkyl or alkenyl; wherein two groups selected from $R^2$, $R^3$, $R^4$, $R^5$ may form with Q a cyclic structure;

with the provisio that when Q is a sulphur atom one of the $R^2$, $R^3$, $R^4$, $R^5$ radicals is not present.

Amino-phosphonium derivatives which are suitable in the composition of the invention generally comply with formula (AP-1) or (AP-2):

$$\{[P(NR^6R^7)_nR^8_{4-n}]^+\}_qY^{q-} \quad \text{(AP-1)}$$

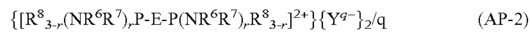

$$\{[R^8_{3-r}(NR^6R^7)_rP\text{-}E\text{-}P(NR^6R^7)_rR^8_{3-r}]^{2+}\}\{Y^{q-}\}_2/q \quad \text{(AP-2)}$$

wherein:

each of $R^6$, $R^7$ and $R^8$, equal to or different from each other, is independently selected from the group consisting of:

$C_1$-$C_{18}$ alkyl group (preferably $C_1$-$C_{12}$ alkyl group); $C_4$-$C_7$ cycloalkyl group; $C_6$-$C_{18}$ aryl group (preferably $C_6$-$C_{12}$ aryl group); $C_6$-$C_{18}$ arylalkyl group (preferably $C_6$-$C_{12}$ arylalkyl group);

$C_1$-$C_{18}$ oxyalkyl group comprising one or more than one hydroxyl or oxygen ethereal group;

and wherein $R^6$, $R^7$ and $R^8$ can optionally contain halogens, CN, OH, carbalkoxy groups; wherein $R^6$ and $R^7$ can form with the nitrogen atom an heterocyclic ring;

E is a $C_1$-$C_6$ divalent alkylenic, oxyalkylenic or $C_6$-$C_{12}$ arylenic radical;

n is an integer from 1 to 4;

r is an integer from 1 to 3;

q is the valence of the anion Y, and is preferably an integer from 1 to 2;

Y is an organic or inorganic anion having valence q; Y can be selected from halides, perchlorate, nitrate, tetrafluoroborate, hexafluorophosphate, oxalate, acetate, stearate, haloacetate, para-toluensulphonate, phenate, bisphenate, hydroxide; Y can also be a complex anion for example $ZnCl_4^{2-}$, $CdCl_4^{2-}$, $NiBr_4^{2-}$, $HgI_3$.

Phosphoranes which are suitable in the composition of the invention generally comply with formula (P):

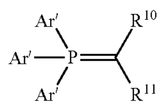

wherein:

each of Ar', equal to or different from each other, is a optionally substituted aryl group, preferably an optionally substituted phenyl group or an optionally substituted naphthyl group;

each of $R^{10}$ and $R^{11}$, equal to or different from each other, is independently selected from the group consisting of —H, —CN, $C_1$-$C_8$ alkyl, —O—C(O)—$R^{12}$ group, —C(O)—$R^{12}$ group, —$NR^{13}$—C(O)—$R^{12}$ group, with $R^{12}$ being a $C_1$-$C_6$ (cyclo)alkyl group, and $R^{13}$ being H or a $C_1$-$C_6$ (cyclo)alkyl group, $R^{10}$ and $R^{11}$ possibly forming together with the carbon atom of the P═C bond a cyclic group.

Imine compounds which are suitable in the composition of the invention generally comply with formula (I):

$$[(R^{14})_3P{=}N{=}P(R^{14})_3]^+\}_zX^{z-} \quad \text{(I)}$$

wherein:

$R^{14}$, equal to or different from each other at each occurrence, is selected from the group consisting of $C_1$-$C_{12}$ hydrocarbon groups, optionally comprising one or more than one group including a heteroatom selected from the group consisting of O, N, S, halogen;

X is an anion of valence z, with z being an integer, generally 1 or 2.

Examples of accelerants that may be used include: quaternary ammonium or phosphonium salts as notably described in EP 335705 A (MINNESOTA MINING) Apr. 10, 1989 and U.S. Pat. No. 3,876,654 (DUPONT) Aug. 4, 1975; aminophosphonium salts as notably described in U.S. Pat. No. 4,259,463 (MONTEDISON SPA) 31 Mar. 1981; phosphoranes as notably described in U.S. Pat. No. 3,752,787 (DUPONT) 14 Aug. 1973; imine compounds as described in EP 0120462 A (MONTEDISON SPA) Mar. 10, 1984 or as described in EP 0182299 A (ASAHI CHEMICAL) 28 May 1986. Quaternary phosphonium salts and aminophosphonium salts are preferred, and more preferably salts of tetrabutylphosphonium, tetrabutyl ammonium, and of 1,1-diphenyl-1-benzyl-N-diethyl-phosphoramine of formula:

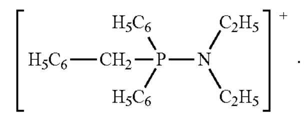

Instead of using the accelerator and the polyhydroxylated curing agent separately, it is also possible to use an adduct between an accelerant and a polyhydroxylated curing agent in a mole ratio of from 1:2 to 1:5 and preferably from 1:3 to 1:5. In said adducts, the cation is hence represented by the positively charged moiety of any of the accelerants selected from the group consisting of organic onium compounds, amino-phosphonium derivatives, and imine compounds as listed above, and the anion is represented by the said polyhydroxylated curing agent, wherein one or more of the hydroxyl group has been deprotonated.

The adducts between the accelerant and the polyhydroxylated curing agent is generally obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethylphosphoramine and tetrabutylphosphonium; particularly preferred anions are those derived from bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in European patent application EP 0684277 A (AUSIMONT SPA) 29 Nov. 1995, which is included herein in its entirety by reference.

The amount of the accelerant is generally of at least 0.05 phr, preferably at least 0.1 phr, and/or generally at most 10 phr, preferably at most 5 phr, with respect to the fluoroelastomer (A) weight.

The composition comprises (d) at least one metal oxide selected from the group consisting of divalent metal oxides.

Among metal oxides of divalent metals, mention can be notably made of ZnO, MgO, PbO, and their mixtures, with MgO being preferred.

The amount of the metal oxide is generally of at least 0.5 phr, preferably at least 1 phr, and/or generally at most 25 phr, preferably at most 15 phr, more preferably at most 10 phr, with respect to the fluoroelastomer (A) weight.

The composition may (e) optionally comprise at least one metal hydroxide, with the provision that if said metal hydroxide is present, its amount is below 3 phr, based on 100 weight parts of fluoroelastomer (A).

Hydroxides which can be used are generally selected from the group consisting of $Ca(OH)_2$, $Sr(OH)_2$, $Ba(OH)_2$.

It is generally understood that performances of the composition of the invention can be optimized wherein the amount of metal hydroxide(s) is advantageously below 2.5 phr, preferably below 2 phr, more preferably below 1 phr, based on 100 weight parts of fluoroelastomer (A).

Very good performances have been obtained wherein the composition of the invention is substantially free from metal hydroxides, as above detailed.

The expression "substantially free from metal hydroxide" is to be understood to mean that no addition of metal hydroxide has been performed for the manufacture of the composition of the invention, being understood that minor amounts, below 0.1 phr, based on the weight of fluoroelastomer (A), might still be present as impurities, without this affecting the performances of the composition of the invention.

According to certain preferred embodiments, the fluoroelastomer composition of the invention is substantially free from fluorinated surfactants, which means that either said fluorinated surfactants are absent, or are comprised in an amount of not exceeding 100 ppm, preferably not exceeding 50 ppm, more preferably not exceeding 10 ppm, with respect to the weight of the fluoroelastomer (A). According to these preferred embodiments, in the fluoroelastomer composition use is preferably made of a fluoroelastomer (A) which has been obtained from emulsion polymerization in the absence of added fluorinated surfactant.

In addition, other conventional additives, such as reinforcing fillers (e.g. carbon black), thickeners, pigments, antioxidants, stabilizers and the like, may then be added to the composition of the invention.

The invention relates further to a method for making the fluoroelastomer composition, as above detailed, said method comprising mixing a fluoroelastomer (A), as above detailed, with (b) at least one polyhydroxylated curing agent; (c) at least one accelerant; (d) at least one metal oxide selected from the group consisting of divalent metal oxides; and (e) optionally, at least one metal hydroxide, wherein the amount of said metal hydroxide, if present, is below 3 phr, based on 100 weight parts of fluoroelastomer (A).

According to preferred embodiments wherein the fluoroelastomer composition is substantially free from fluorinated surfactants, the method comprises a step of producing by aqueous emulsion polymerization initiated by a persulfate radical initiator in the absence of fluorosurfactant and, optionally, in the presence of a chain transfer agent of formula $R_H'OC(O)R_H$, with $R_H$ and $R_H'$ being a $C_1$-$C_6$ alkyl group the fluoroelastomer (A), recovering the said fluoroelastomer (A) by coagulation and drying, and mixing the same, as above detailed.

The invention also pertains to a method for fabricating shaped articles, comprising using the composition including fluoroelastomer (A) as above described.

The composition can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, composition including fluoroelastomer (A) into a finished article made of non-tacky, strong, insoluble, chemically and thermally resistant cured fluoroelastomer.

Finally, the invention pertains to cured articles obtained from the composition of the invention. Said cured articles are generally obtained by moulding and curing the composition comprising fluoroelastomer (A), as above detailed.

The cured articles can be notably pipes, joints, O-ring, hose, and the like.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Preparative Examples

Preparative Example 1

In a 22 litres reactor equipped with a mechanical stirrer operating at 460 rpm, 14.5 l of demineralized water and 39 g of ethyl acetate were introduced. The reactor was heated and maintained at a set-point temperature of 85° C.; a mixture of vinylidene fluoride (VDF) (78.5% moles) and hexafluoropropene (HFP) (21.5% moles) was then added to reach a final pressure of 20 bar. 19 g of ammonium persulfate (APS) as initiator were then introduced. Pressure was maintained at set-point of 20 bar by continuous feeding of a gaseous mixture of VDF (78.5% moles) and HFP (21.5% moles) up to a total of 6600 g. Then the reactor was cooled, vented and the latex recovered. The latex was treated with aluminum sulphate, separated from the aqueous phase, washed with demineralized water and dried in a convection oven at 90° C. for 16 hours. The composition of the obtained polymer by NMR and molecular weight distribution by GPC are summarized in table 1.

Preparative Example 2

In a 22 litres reactor equipped with a mechanical stirrer operating at 460 rpm, 14.5 l of demineralized water and 27 g of ethyl acetate were introduced. The reactor was heated and maintained at a set-point temperature of 85° C.; a mixture of vinylidene fluoride (VDF) (78.5% moles) and hexafluoropropene (HFP) (21.5% moles) was then added to reach a final pressure of 20 bar. 16 g of ammonium persulfate (APS) as initiator were then introduced. Pressure was maintained at set-point of 20 bar by continuous feeding of a gaseous mixture of VDF (78.5% moles) and HFP (21.5% moles) up to a total of 6600 g. Then the reactor was cooled, vented and the latex recovered. The latex was treated with aluminum sulphate, separated from the aqueous phase, washed with demineralized water and dried in a convection oven at 90° C. for 16 hours. The composition of the obtained polymer by NMR and molecular weight distribution by GPC are summarized in table 1.

Preparative Example 3

In a 22 litres reactor equipped with a mechanical stirrer operating at 460 rpm, 14.5 l of demineralized water and 15 g of ethyl acetate were introduced. The reactor was heated and maintained at a set-point temperature of 85° C.; a mixture of vinylidene fluoride (VDF) (78.5% moles) and hexafluoropropene (HFP) (21.5% moles) was then added to reach a final pressure of 20 bar. 13 g of ammonium persulfate (APS) as initiator were then introduced. Pressure was maintained at set-point of 20 bar by continuous feeding of a gaseous mixture of VDF (78.5% moles) and HFP (21.5% moles) up to a total of 6600 g. Then the reactor was cooled, vented and the latex recovered. The latex was treated with aluminum sulphate, separated from the aqueous phase, washed with demineralized water and dried in a convection oven at 90° C. for 16 hours. The composition of the obtained polymer by NMR and molecular weight distribution by GPC are summarized in table 1.

Preparative Example 4C—of Comparison

In a 22 litres reactor equipped with a mechanical stirrer operating at 460 rpm, 14.5 l of demineralized water and 75 g of ethyl acetate were introduced. The reactor was heated and maintained at a set-point temperature of 85° C.; a mixture of vinylidene fluoride (VDF) (78.5% moles) and hexafluoropropene (HFP) (21.5% moles) was then added to reach a final pressure of 20 bar. 27 g of ammonium persulfate (APS) as initiator were then introduced. Pressure was maintained at set-point of 20 bar by continuous feeding of a gaseous mixture of VDF (78.5% moles) and HFP (21.5% moles) up to a total of 6600 g. Then the reactor was cooled, vented and the latex recovered. The latex was treated with aluminum sulphate, separated from the aqueous phase, washed with demineralized water and dried in a convection oven at 90° C. for 16 hours. The composition of the obtained polymer by NMR and molecular weight distribution by GPC are summarized in table 1.

Preparative Example 5C—of Comparison

In a 22 l horizontal reactor, equipped with a stirrer working at 460 rpm 14.5 l of water and 145 ml of a microemulsion, previously obtained by mixing 31 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 31 ml of a 30% v/v NH4OH aqueous solution, 63 ml of demineralized water and 20 ml of GALDEN® D02 perfluoropolyether of formula: $CF_3O(CF_2CF(CF_3)O)_n(CF_2O)_mCF_3$ with n/m=20, having average molecular weight of 450, were introduced. The reactor is heated up to 122° C. and then brought to the pressure of 37 relative bar by feeding the monomers until having the following composition of the gaseous phase: VDF=53% by moles HFP=47% by moles. Due to the feeding of 30 g of diterbutylperoxide (DTBP) the reaction starts and the pressure is kept constant for the whole polymerization by feeding a mixture formed by: VDF=78.5% by moles, HFP=21.5% by moles. Ethyl acetate chain transfer agent (16 g) was added stepwise as a function of VDF consumption. After a prefixed amount of monomeric mixture corresponding to 4,600 g has reacted, the reaction was stopped. The latex was then coagulated by using an electrolyte agent (aluminum sulphate), washed and dried at 80° C. for 24 h.

TABLE 1

| | Prep. Ex. 1 | Prep. Ex. 2 | Prep. Ex. 3 | Prep. Ex. 4C | Prep. Ex. 5C |
|---|---|---|---|---|---|
| Composition (% moles) | | | | | |
| VDF | 78 | 78 | 78 | 78 | 79 |
| HFP | 22 | 22 | 22 | 22 | 21 |
| End of chains (short chains/long chains) (mmol/kg) | | | | | |
| $—CF_2H$ | 34 | 33 | 31 | 44 | 78 |
| $—CF_2CH_3$ | 11 | 10 | 10 | 14 | 33 |
| $—CF_2CH_2OH$ | 5.5 | 4.4 | 3.8 | 9.2 | 0.0 |
| $—OC(O)CH_3$ | 7 | 4 | 3 | 3 | 0 |
| Total chain ends | 57.5 | 51.4 | 47.8 | 70.2 | 111.0 |
| Molecular weight determination[(a)] | | | | | |
| Mn | 62482 | 89379 | 91513 | 61477 | 64015 |
| $I_{MWD}$ | 2.6 | 2.5 | 3.4 | 3.8 | 5.7 |
| Relation between total number of chain ends and Mn | | | | | |
| $30 + (2 \times 10^6)/M_n$ | 62.0 | 52.4 | 51.8 | 62.5 | 61.2 |
| Total chain ends ≤ $30 + (2 \times 10^6)/M_n$ | YES | YES | YES | NO | NO |

[(a)]Number averaged molecular weight and polydispersity index have been determined by GPC using autosampler model Waters 717 plus injection system; column set: Precolumn + 4 Waters Styragel HR: 106, 105, 104 and 103 Å; Waters Refractive Index mod. 2414 detector; Tetrahydrofuran (THF) as solvent and Waters Empower 3 as software for data acquisition and processing.

(a) Number averaged molecular weight and polydispersity index have been determined by GPC using autosampler model Waters 717 plus injection system; column set: Precolumn+4 Waters Styragel HR: 106, 105, 104 and 103 Å; Waters Refractive Index mod. 2414 detector; Tetrahydrofuran (THF) as solvent and Waters Empower 3 as software for data acquisition and processing.

Fluoroelastomers (A) as obtained in preparative examples can be categorized, on the basis of the amount of end of short and long chains, in two groups, i.e. fluoroelastomers wherein the number of chain ends in mmol/kg is below the threshold of $30+(2\times10^6)/M_n$ (i.e. fluoroelastomers of preparative examples 1 to 3), and fluoroelastomers wherein the number of chain ends in mmol/kg is beyond the threshold of $30+(2\times10^6)/M_n$ (i.e. fluoroelastomers of preparative examples 4 and 5, of comparison).

This can be visually sketched as depicted in the FIGURE.

Mechanical and Chemical Resistance Property Determination on Cured Samples

Fluoroelastomers were compounded with the additives as detailed in following table in an open mill. Plaques and O-rings (size class=214) have been cured in a pressed mould and then post-treated in an air circulating oven in conditions (time, temperature) below specified. The tensile properties have been determined on specimens punched out from the plaques, according to the ASTMD412C Standard at 23° C.

M 50 is the tensile strength in MPa at an elongation of 50%

M 100 is the tensile strength in MPa at an elongation of 100%

T.S. is the tensile strength in MPa;

E.B. is the elongation at break in %.

The Shore A hardness (3") (HDS) has been determined on 3 pieces of plaque piled according to the ASTM D 2240 method.

The compression set (C-SET) has been determined on O-ring, spaceman standard AS568A (type 214) or on 6 mm buttons (type 2), according to the ASTM D 395, method B.

Cure behaviour was characterized by Moving Die Rheometer (MDR), in conditions as specified below, by determining the following properties:

$M_L$=Minimum torque (lb×in)

$M_H$=Maximum torque (lb×in)

$\Delta M=M_H-M_L$ (lb×in)

$t_{S2}$=Scorch time, time for two units rise from $M_L$ (sec);
$t_{90}$=Time to 90% state of cure (sec).
Chemical resistance was evaluated according ASTM D471 standard; more precisely, by performing a IRM903 test at 23° C. during 70 h with methanol.

Results are summarized in the following tables.

TABLE 2

| Run | | 1 | 2 | 3 | 4C | 5C |
|---|---|---|---|---|---|---|
| Elastomer | | | | | | |
| From Prep. Ex. 1 | phr | 100 | | | | |
| From Prep. Ex. 2 | phr | | 100 | | | |
| From Prep. Ex. 3 | phr | | | 100 | | |
| From Prep. Ex. 4C | phr | | | | 100 | |
| From Prep. Ex. 5C | phr | | | | | 100 |
| Other ingredients | | | | | | |
| GM102E(1) | phr | 0.37 | 0.37 | 0.37 | 0.37 | 0.37 |
| bisphenol(2) | phr | 2.17 | 2.17 | 2.17 | 2.17 | 2.17 |
| MgO(3) | phr | 7 | 7 | 7 | 7 | 7 |
| $Ca(OH)_2$(4) | phr | 0 | 0 | 0 | 0 | 0 |
| Carbon black (5) | phr | 30 | 30 | 30 | 30 | 30 |
| MDR curing 6 min at 177° C. | | | | | | |
| $M_H$ | lb × in | 22.0 | 22.6 | 25.8 | 18.9 | 16.6 |
| ΔM | lb × in | 21.7 | 21.9 | 24.0 | 18.2 | 15.4 |
| $t_{S2}$ | s | 2.5 | 2.2 | 1.8 | 6.2 | 1.9 |
| $t_{90}$ | s | 4.2 | 3.9 | 3.6 | 14.1 | 3.2 |
| Molding: 6 min at 180° C. Post cure: (8 + 16) h at 250° C. Mechanical Properties at room temperature (23° C.) | | | | | | |
| Tensile Strength | MPa | 15.4 | 16.9 | 17.6 | 16.2 | 15.9 |
| M50 | MPa | 3.4 | 3.2 | 3.1 | 2.8 | 2.0 |
| M100 | MPa | 7.4 | 7.6 | 7.5 | 6.3 | 4.6 |
| Elongation @ Break | % | 174 | 179 | 185 | 201 | 230 |
| Hardness (Shore A) | pts | 78 | 76 | 75 | 73 | 68 |
| Sealing properties | | | | | | |
| C-set 70 h at 200° C. | % | 13 | 13 | 11 | 18 | 18 |

(1)Benzyltriphenylphosphonium bisphenol AF salt commercially available from Lianyungang TetraFluor New Materials Co., Ltd.;
(2)Bisphenol AF commercial available from Honeywell
(3)MAGLITE ® DE high surface area, high activity magnesium oxide from Merck;
(4)Rhenofit ® CF (GE 1890) calcium hydroxide from Rhein Chemie;
(5) Reinforcing filler Carbon black N990MT from Cancarb.

Data comprised in Table 2 herein above well demonstrate the technical advantages of the fluoroelastomer composition of the invention:

a high curing rate is achieved for inventive compounds, while example of comparison to 4C clearly show that increasing beyond the limit of 6 mmol/kg the amount of polar end groups of formula $—CF_2CH_2OH$ in fluoroelastomer (A) detrimentally affect the said curing rate;

improved mechanical properties with higher M50 and M100 values are achieved through the fluoroelastomer compositions of the invention;

improved sealing properties, as evidenced by lower compression set values are achieved with the fluoroelastomer compositions of the invention.

Furthermore, fluoroelastomer compositions of examples 1 to 3 comprising fluoroelastomers manufactured in the absence of fluorinated surfactants have been found to provide under above detailed conditions cured articles which do not undergo any change of colour, nor degradation phenomenon which may affect visual appearance of the cured articles.

The invention claimed is:

1. A fluoroelastomer composition comprising:

(a) a vinylidene fluoride-based fluoroelastomer (A) comprising recurring units derived from vinylidene fluoride (VDF) and recurring units derived from at least one additional (per)fluorinated monomer; said fluoroelastomer (A):

possessing a polydispersity index ($I_{MWD}$) of between 1.5 and 3.5, comprising an amount of polar end groups of formula $—CF_2CH_2OH$ of at least 3 mmol/kg and at most 6 mmol/kg, and further comprising end of chain groups of formula $—CF_2H$, $—CF_2CH_3$, and, optionally, $—OC(O)—R_H$ (with $R_H$ being a $C_1$-$C_6$ alkyl group) in an amount such to satisfy the following inequality:

$$[—CF_2CH_2OH]+[—CF_2H]+[—CF_2CH_3]+[—OC(O)R_H]\leq 30+(2\times 10^6)/M_n,$$

(b) at least one polyhydroxylated curing agent;

(c) at least one accelerant;

(d) at least one metal oxide selected from the group consisting of divalent metal oxides; and (e) optionally, at least one metal hydroxide, wherein the amount of said metal hydroxide, if present, is below 3 phr, based on 100 weight parts of fluoroelastomer (A), wherein the fluoroelastomer composition is substantially free from fluorinated surfactants, and wherein the fluoroelastomer (A) comprises, in addition to recurring units derived from VDF, recurring units derived from HFP in an amount of at least 10% moles with respect to all recurring units of the fluoroelastomer and/or in an amount of at most 45% moles with respect to all recurring units of the fluoroelastomer.

2. The fluoroelastomer composition of claim 1, wherein fluoroelastomer (A) comprises at least 15% moles of recurring units derived from VDF, with respect to all recurring units of the fluoroelastomer and/or wherein fluoroelastomer (A) comprises at most 85% moles of recurring units derived from VDF, with respect to all recurring units of the fluoroelastomer.

3. The fluoroelastomer composition of claim 2, wherein fluoroelastomer (A) comprises at least 35% moles and at most 78% moles of recurring units derived from VDF, with respect to all recurring units of the fluoroelastomer.

4. The fluoroelastomer composition of claim 1, wherein the at least one additional (per)fluorinated monomer is selected from:

(a) $C_2$-$C_8$ perfluoroolefins, different from HFP;

(b) hydrogen-containing $C_2$-$C_8$ olefins different from VDF;

(c) $C_2$-$C_8$ chloro and/or bromo and/or iodo-fluoroolefins;

(d) (per)fluoroalkylvinylethers (PAVE) of formula $CF_2$=$CFOR_f$, wherein $R_f$ is a $C_1$-$C_6$ (per)fluoroalkyl group;

(e) (per)fluoro-oxy-alkylvinylethers of formula $CF_2$=CFOX, wherein X is a $C_1$-$C_{12}$ ((per)fluoro)-oxyalkyl comprising catenary oxygen atoms;

(f) (per)fluorodioxoles having formula:

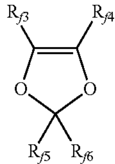

wherein $R_{f3}$, $R_{f4}$, $R_{f5}$, $R_{f6}$, equal or different from each other, are independently selected from fluorine atoms and $C_1$-$C_6$ (per)fluoroalkyl groups, optionally comprising one or more than one oxygen atom;

(g) (per)fluoro-methoxy-vinylethers (MOVE) having formula:

$CFX_2$=$CX_2OCF_2OR''_f$ wherein $R''_f$ is selected from $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is F or H.

5. The fluoroelastomer composition of claim 1, wherein fluoroelastomer (A) comprises, in addition to recurring units derived from VDF and HFP, one or more of the following:

recurring units derived from at least one bis-olefin [bis-olefin (OF)] having general formula:

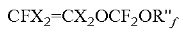

wherein $R_1$, $R_2$, $R_3$, $R_4$, $R_5$ and $R_6$, equal or different from each other, are H, a halogen, or a $C_1$-$c_5$ optionally halogenated group, optionally comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;

recurring units derived from at least one (per)fluorinated monomer different from VDF and HFP; and recurring units derived from at least one hydrogenated monomer.

6. The fluoroelastomer composition of claim 5, wherein fluoroelastomer (A) is selected from the group consisting of those having following compositions (in mol %):

(i) vinylidene fluoride (VDF) 45-85%; hexafluoropropene (HFP) 15-45%;

tetrafluoroethylene (TFE) 0-30%;

(ii) vinylidene fluoride (VDF) 20-30%; hexafluoropropene (HFP) 18-27%; $C_2$-$C_8$ non-fluorinated olefins (Ol) 5-30%; perfluoroalkyl vinyl ethers (PAVE) 0-35%; bis-olefin (OF) 0-5%; and (iii) vinylidene fluoride (VDF) 60-75%; hexafluoropropene (HFP) 10-25%;

tetrafluoroethylene (TFE) 0-20%; perfluoroalkyl vinyl ethers (PAVE) 1-15%.

7. The fluoroelastomer composition of claim 1, wherein fluoroelastomer (A) comprises an amount of polar end groups of formula —$CF_2CH_2OH$ of at least 3.5 mmol/kg, and/or at most 5 mmol/kg.

8. The fluoroelastomer composition of claim 1, wherein the polyhydroxylated curing agent is selected from the group consisting of dihydroxy benzenes, trihydroxy benzenes, tetrahydroxy benzenes, dihydroxy naphthalenes, trihydroxy naphthalenes, tetrahydroxy naphthalenes, dihydroxy anthracenes, trihydroxy anthracenes, tetrahydroxy anthracenes and bisphenols of formula (B):

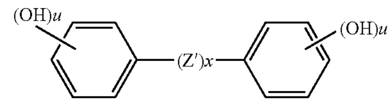

wherein:

Z' is selected from the group consisting of bivalent $C_1$-$C_{13}$ alkyl groups, $C_1$-$C_{13}$ alkylidene groups, $C_4$-$C_{13}$ cycloaliphatic groups, $C_6$-$C_{13}$ aromatic groups, $C_6$-$C_{13}$ arylalkylenic groups, each of the above optionally substituted with at least one chlorine or fluorine atom; thio (—S—), oxy (—O—), carbonyl (—C(O)—), sulphinyl (—S(O)—) and sulphonyl (—$SO_2$—);

x is 0 or 1;

u, equal to or different from each other, is independently at each occurrence an integer of at least 1;

and wherein the phenyl rings can be optionally substituted by one or more substituents selected from the group consisting of chlorine, fluorine, bromine; —CHO, $C_1$-$C_8$ alkoxy groups, —$COOR_{10}$ groups, wherein $R_{10}$ is H or $C_1$-$C_8$ alkyl, $C_6$-$C_{14}$ aryl, and $C_4$-$C_{12}$ cycloalkyl.

9. The fluoroelastomer composition of claim 1, wherein the amount of polyhydroxylated curing agent is of at least 0.5 phr and/or at most 15 phr, with respect to the fluoroelastomer (A) weight.

10. The fluoroelastomer composition of claim 9, wherein the amount of polyhydroxylated curing agent is of at least 1 phr, and at most 10 phr, with respect to the fluoroelastomer (A) weight.

11. The fluoroelastomer composition of claim 1, wherein the accelerant is selected from the group consisting of organic onium compounds, amino-phosphonium derivatives, phosphoranes, imine compounds and/or wherein the amount of accelerant is of at least 0.05 phr and/or at most 10 phr with respect to the fluoroelastomer (A) weight.

12. The fluoroelastomer composition of claim 11, wherein the accelerant is selected from the group consisting of organic onium compounds, amino-phosphonium derivatives, phosphoranes, imine compounds and wherein the amount of accelerant is of at least 0.1 phr and at most 5 phr, with respect to the fluoroelastomer (A) weight.

13. The fluoroelastomer composition of claim 1, wherein the metal oxides are selected from the group consisting of ZnO, MgO, PbO, and their mixtures and/or wherein the amount of metal oxide is of at least 0.5 phr and/or at most 25 phr with respect to the fluoroelastomer (A) weight.

14. The fluoroelastomer composition of claim 13, wherein the metal oxides are selected from the group consisting of ZnO, MgO, PbO, and their mixtures and wherein the amount of metal oxide is of at least 1 phr and at most 10 phr, with respect to the fluoroelastomer (A) weight.

15. A method for making the fluoroelastomer composition of claim 1, said method comprising mixing (a) a fluoroelastomer (A); (b) at least one polyhydroxylated curing agent; (c) at least one accelerant; (d) at least one metal oxide selected from the group consisting of divalent metal oxides; and (e) optionally, at least one metal hydroxide, wherein the amount of said metal hydroxide, if present, is below 3 phr, based on 100 weight parts of fluoroelastomer (A).

16. The method of claim 15, said method comprising (i) producing fluoroelastomer (A) by aqueous emulsion polymerization initiated by a persulfate radical initiator in the absence of fluorosurfactant and, optionally, in the presence of a chain transfer agent of formula $R_H'OC(O)R_H$, with $R_H$ and $R_H'$ being a $C_1$-$C_6$ alkyl group, (ii) recovering fluoroelastomer (A) by coagulation and drying, and (iii) mixing the same as detailed in claim 13.

17. A method for fabricating a shaped article, comprising molding the fluoroelastomer composition according to claim 1 into the shaped article.

18. A cured article obtained by moulding and curing the fluoroelastomer composition according to claim 1.

* * * * *